United States Patent [19]

Ruffa

[11] Patent Number: 5,046,055

[45] Date of Patent: Sep. 3, 1991

[54] MODIFICATION TO TOWED ARRAY BULKHEADS

[75] Inventor: Anthony A. Ruffa, Niantic, Conn.

[73] Assignee: The United States of America as represented by the Secretary of the Navy, Washington, D.C.

[21] Appl. No.: 576,263

[22] Filed: Aug. 27, 1990

[51] Int. Cl.$^5$ ............................................. G01V 1/38
[52] U.S. Cl. .................................... 367/154; 367/20; 174/101.5
[58] Field of Search ................. 367/16, 17, 20, 106, 367/130, 154, 155, 171; 174/101.5

[56] References Cited

U.S. PATENT DOCUMENTS

| | | | |
|---|---|---|---|
| 4,694,436 | 9/1987 | Gelfand | 367/120 |
| 4,762,208 | 8/1988 | Reynier et al. | 367/154 |
| 4,775,962 | 10/1988 | Keckler et al. | 367/154 |
| 4,821,241 | 4/1984 | Berglund | 174/101.5 |
| 4,955,012 | 9/1990 | Bledsoe et al. | 367/20 |

FOREIGN PATENT DOCUMENTS 2162638  2/1986  United Kingdom ................ 367/20

Primary Examiner—Deborah L. Kyle
Assistant Examiner—J. Woodrow Eldred
Attorney, Agent, or Firm—Michael J. McGowan; Prithvi C. Lall

[57] ABSTRACT

A towed array of hydrophone modules employs bladders that are mounted to the bulkheads at the ends of the hose sections. The bladders are configured and pressurized so that pressure waves produced by the oscillatory motion of the bulkhead are suppressed by the bladders thereby significantly diminishing noise due to the breathing waves.

9 Claims, 1 Drawing Sheet

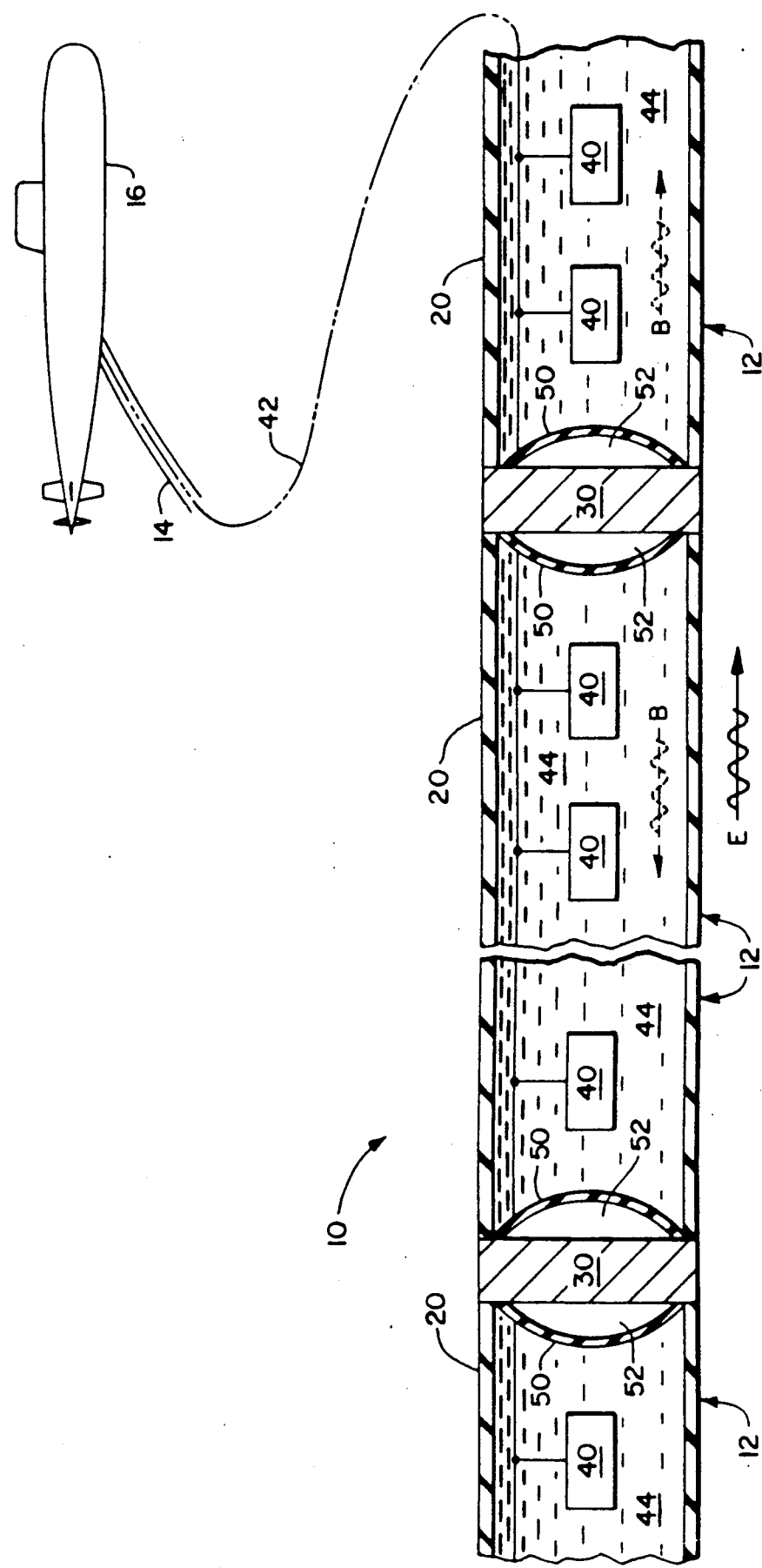

MODIFICATION TO TOWED ARRAY BULKHEADS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention relates generally to hydrophone modules that are towed by ocean vessels. More particularly, the present invention relates generally to hydrophone units that are mounted between bulkheads of modular arrays towed by surface ships and submarines.

(2) Description of the Prior Art

Arrays of hydrophones in modules are conventionally towed by surface ships and submarines for the purpose of sensing sound below the surface of the ocean. Typically, such arrays are linear assemblies of coupled modules, each module comprised of hose sections that have bulkheads at opposing ends. Hydrophones are mounted in the hose sections. The hose sections are filled with fluid that surrounds the hydrophones. Sound pressure waves in the ocean pass through the hose wall and into the fluid that surrounds the hydrophones. The hydrophones sense the pressure fluctuations and transform the sensed pressures into electrical signals which are transmitted via a cable back to the vessel. The electrical signals are then processed to derive the sound or a representation thereof.

During the towing of the array, the hose walls of the linear array and the center strength member, if the array has one, may be subject to extensional waves transmitted through the tow cable. The extensional waves may have a motion component produced by differential motion of the vessel and also a vibrational component produced by the forces exerted on the cable due to vortex shedding. Because the bulkheads disposed at the ends of the modules are mechanically connected to the hose wall, the bulkheads are driven into an oscillatory state by the extensional waves propagated within the hose wall.

When the bulkheads oscillate, their motion generates pressure waves in the fluid, on each side of each bulkhead. The pressure waves are sensed by adjacent hydrophones and transmitted electronically as noise. The hose wall responds to the pressure waves by alternately expanding (or bulging) and contracting as the waves travel through the fluid, thus producing a "breathing" effect in the system. As the hose wall expands, its circumferential stiffness determines the amplitude of the pressure waves. These "breathing waves" introduce a significant noise factor into the sound sensing process.

It is well established that the amplitude of these pressure waves is a function of the effective stiffness of the system comprised of the hose wall filled with fluid. Given two hoses filled with fluid of the same density, the effective stiffness of the system is determined by the circumferential stiffness of the hose wall. Various modifications have been made to the hose wall in attempts to decrease the energy produced by the breathing waves. Nevertheless, significant quantities of system noise from this source are received by the hydrophones, and at this time even sophisticated electronic processing cannot remove the noise.

SUMMARY OF THE INVENTION

It is therefore an object of the invention to provide a new and improved modification to the bulkheads in the towed array modules to substantially diminish the adverse effects of breathing waves in the towed arrays. The invention is expected to suppress the breathing wave that is produced by the oscillatory motion of the bulkhead.

A further object of the invention is to suppress the breathing wave by mechanical means instead of attempting an electronic solution, because a mechanical solution will suppress the noise more effectively and will be easier to accomplish and less expensive. These and other objects of the invention will become more apparent from the following description.

The above objects are realized by providing a modified bulkhead assembly for the modules of linear arrays towed by surface ships or submarines. The array is comprised of a plurality of coupled hose wall sections wherein the ends of the sections are reinforced by bulkheads. Hydrophone units are disposed in the hose sections. The hydrophone units are surrounded by a fluid. In accordance with the invention, bladders are mounted to the bulkheads. The bladders are sufficiently pressurized with a gas to enable them to remain fully compressible at operational towing depths. The bladders are preferably mounted to opposing sides of each of the bulkheads. The gas in the bladders is now the most compliant element in a system comprised of a fluid-filled hose with gas-filled bladders mounted on either side of the bulkheads at the ends of the hose sections. Therefore, the compressibility of the gas-filled bladders replaces the circumferential stiffness of the hose wall as the determinant of the effective stiffness of the system. The pressure caused by the displacement of the bulkhead has to compress the bladder before causing any expansion of the hose wall. The compression of the bladder reduces the amplitude of the pressure wave significantly. The hydrophone output due to this pressure will be close to or below the noise floor of the hydrophones.

BRIEF DESCRIPTION OF THE DRAWING

The single figure shows a fragmentary sectional view, partly in schematic, of a towed array incorporating a modification to the hose section bulkheads in accordance with the present invention.

DESCRIPTION OF THE PREFERRED EMBODIMENT

With reference to the Figure, a towed array of modules containing hydrophones is generally designated by the numeral 10. The array is comprised of a linear series of modules 12 that are coupled together to form the array. The array 10 is towed from a subsea cable 14 behind a surface ship or a submarine 16 for the purpose of detecting sound below the surface of the ocean.

Each of the modules 12 has a housing constructed from a reinforced hose 20 which is manufactured from an elastomer or plastic and reinforced with Kevlar TM fiber or other suitable fibers. Each of the hose sections will be typically several inches in diameter and have a length of 40 to 250 feet. The relative dimensions of the modules are distorted in the Figure for illustration purposes. Reinforced bulkheads 30 are fixedly positioned at each end of the sections. Hydrophones 40 are disposed in each of the hose sections. The hose sections are coupled together to form the towed array. The hydrophones communicate via an electric cable 42 that is inside the tow cable 14 and passes through the bulkheads 30. The hose sections are filled with a fluid 44 that surrounds the hydrophones 40.

Sound pressure waves in the ocean pass through the wall of the hose 20 and into the fluid 44 that surrounds the hydrophones 40. The hydrophones sense the fluctuation of the pressure caused by the sound waves in the fluid and convert the pressure fluctuations to corresponding electrical signals. The electrical signals are then transmitted over the cable 42 to the tow vessel. The electrical signals are then processed to derive the sound or a representation thereof.

For the heretofore described modules, extensional waves E propagate through the hose wall and drive the bulkheads 30 to an oscillatory state, thereby producing pressure waves in the fill fluid 44. The pressure waves in the fluid cause the hose wall to alternately expand (bulge) and contract; this phenomenon is described as a traveling bulge wave or a breathing wave B. As the breathing waves arrive at the hydrophones in the region of the bulkheads, the hydrophones sense the change in pressure. The electrical output that results from this pressure input to the hydrophones represents a significant noise factor in the sensed signals transmitted from the towed array.

In accordance with the invention, small, generally convex shaped bladders 50 are mounted on each side of each of the bulkheads 30. The bladders 50 may be glued or otherwise attached to the bulkheads. The bladders 50 are pressurized with air 52 or other suitable fluids.

When the extensional waves propagated through the hose wall drive the bulkheads into an oscillatory state, the pressure waves caused by the displacement of the bulkheads will compress the bladders before, or instead of, expanding the hose wall. The stiffness of each bladder 50 is designed to be much less than the circumferential stiffness of the corresponding hose wall 20. The compression of the bladder will reduce the amplitude of the pressure waves significantly, which will reduce the hydrophone output due to this pressure to a level close to or below the noise floor of the hydrophone. The compressible bladders attached to the bulkheads will thereby effectively suppress the noise caused by the breathing waves.

In one form of the invention, the bladders are constructed of a plastic or elastomeric material that is compatible with the fill fluid and are pressurized at approximately atmospheric pressure. It should be appreciated that the bladders are much more yielding to external pressures (i.e., deform or compress to a greater degree) than the corresponding walls of the hose for an equivalent impinging pressure pulse.

It is to be understood that various changes in details, materials, steps, and arrangements of parts, which have been herein described and illustrated in order to explain the nature of the invention, may be made by those skilled in the art, within the principle and scope of the invention as expressed in the appended claims.

I claim:

1. A hydrophone assembly adapted for towing by a vessel wherein said hydrophone assembly comprises:
   housing means comprising an elongated sleeve-like section for forming a module wall;
   bulkhead means disposed at an end portion of said section;
   fluid means disposed in said housing means;
   hydrophone means disposed in said section for sensing a pressure wave in said fluid and generating an electrical signal indicative thereof; and
   bulge wave suppressor means mounted in said housing means adjacent to said bulkhead means for suppressing a longitudinal bulge wave traversing said fluid, said bulge wave suppressor including a bladder mounted to said bulkhead means.

2. The hydrophone assembly of claim 1 wherein said bladder is glued to said bulkhead means.

3. The hydrophone assembly of claim 1 wherein said bladder is pressurized by air.

4. The hydrophone assembly of claim 1 wherein said bulkhead means has opposing sides and said suppressor means further comprises a second bladder mounted to said bulkhead means, said bladders being mounted at opposing sides of said bulkhead means.

5. The hydrophone assembly of claim 1 wherein a pressure pulse impinging said suppressor means deforms said suppressor means to a greater degree than the degree of deformation produced by said pressure pulse impinging said housing means.

6. A hydrophone assembly adapted for towing by a vessel comprising:
   a plurality of hydrophone modules connected to form a linear array of coupled modules, each said module comprising:
   housing means comprising an elongated hose section;
   bulkheads disposed at opposing end portions of said sections;
   fluid substantially filling the interior of said sections;
   hydrophone means disposed in said section for sensing a pressure wave in said fluid and transmitting an electrical signal indicative thereof; and
   bulge suppressor means comprising bladders mounted at opposing sides of said bulkheads for suppressing a bulge wave in said fluid.

7. The hydrophone assembly of claim 6 wherein each said bladder is pressurized.

8. The hydrophone assembly of claim 7 wherein at least one said bladder is glued to said bulkhead.

9. The hydrophone assembly of claim 6 wherein a pressure pulse impinging a said bladder deforms said bladder to a greater degree than the degree of deformation produced by said pressure pulse impinging said housing means.

* * * * *